Jan. 26, 1971  F. M. KIEWICZ ET AL  3,557,462
GAGING DEVICE AND SYSTEM
Filed Oct. 30, 1968  3 Sheets-Sheet 2

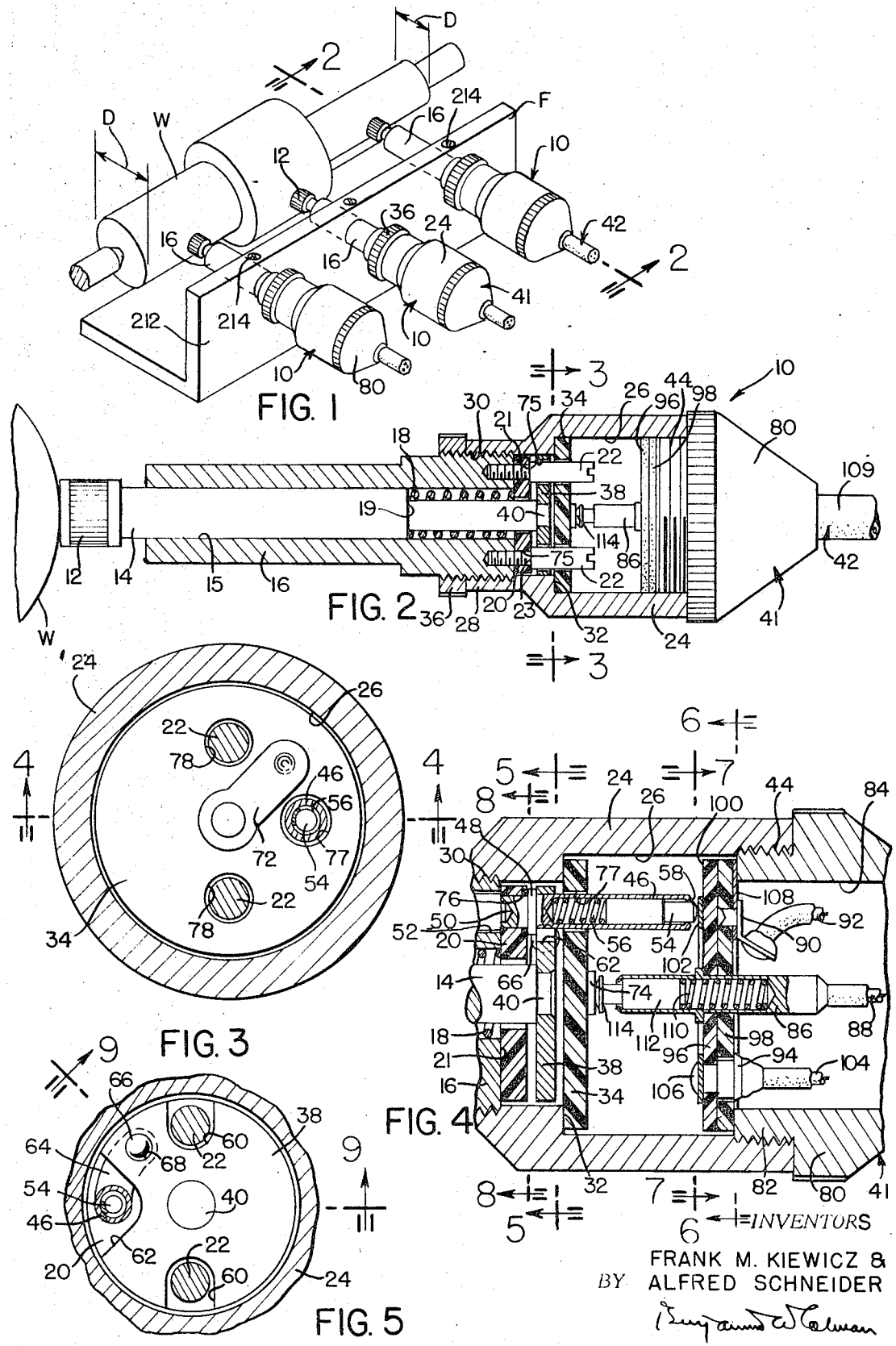

INVENTORS
FRANK M. KIEWICZ &
ALFRED SCHNEIDER
BY
ATTORNEY

INVENTORS
FRANK M. KIEWICZ &
ALFRED SCHNEIDER

BY

ATTORNEY

United States Patent Office 3,557,462
Patented Jan. 26, 1971

3,557,462
GAGING DEVICE AND SYSTEM
Frank M. Kiewicz, Detroit, and Alfred Schneider, Ferndale, Mich., assignors to Inspection Engineering and Equipment, Inc., Royal Oak, Mich., a corporation of Michigan
Filed Oct. 30, 1968, Ser. No. 771,836
Int. Cl. G01b 7/00
U.S. Cl. 33—174
24 Claims

ABSTRACT OF THE DISCLOSURE

A workpiece gaging device and system, in which the gaging device comprises an electrical switch-type gaging head adjustably positionable in a fixture for contact with a surface to be measured, the gaging head embodying circuitry components designed to signal the presence of an undersized dimension or an oversized dimension. The gaging head is connected to an electronic signalling system and embodying a separate circuit for indicating a dimension which lies between the predetermined high and low limits of the gaging system. Thus, the gaging head connected to such electronic circuitry completes the gaging requirements for indicating a surface dimension below a predetermined limit, above a predetermined limit, or within such limits.

---

The invention involves a gaging system which comprises a gaging head embodying an electrical switch for making (and breaking) one of two circuits electrically connected to an indicating or signalling system and the electronic signalling system. The gaging head is so arranged that it embodies a movable switch for making either of two circuits. The components of the gaging head are so arranged that the predetermined high limit and low limit of the dimension to be gaged are set and locked in the head, and such limits can be varied at any time at the option of the user. The variability of the tolerance setting is such that changes in tolerance can be made by merely unlocking a lock nut, repositioning the upper (high limit) contact plate by turning a threaded adjusting ring in the head and relocking the nut against the ring to hold the contact plate in the changed position.

The circuitry is designed to operate at low current. Normal switching of lamp circuits has a destructive effect on contacting surfaces and consequently actuating positions cannot be maintained with any degree of accuracy. The system described uses minute amounts of current which do not deteriorate contact faces to an unusable degree, and can therefore maintain set positions many times longer than ordinary switching. Also, an appropriate low voltage permits closer positioning of contact surfaces for small tolerance spans of .001" or less without arcing.

It is an object of the invention to provide a gaging device and electronic signalling system, operating at low current, wherein a gaging head can be easily arranged for making either of two circuits to the signalling system. Another object is to provide a switch-type gaging head in which low and high tolerance limits are individually and independently established as parts of respective circuitry. Still another object is the provision of a single switching component in the gaging head for either making the circuit for low limit signalling or the circuit for high limit signalling, as the dimension being gaged establishes. A further object is the provision of an electronic signalling system which embodies an independent circuit indicating the presence of a gaged dimension lying within the pre-established high and low limits set in the gaging head. Still at further object is the provision of a relatively sensitive and easily adjustable gaging head for sensing the presence of an undersize or an oversize dimension being gaged, and for indicating the presence of either by a signalling system.

These and additional objects of the invention and features of construction will become more clearly apparent from the description of an exemplary embodiment of the invention given below, in which the terms employed are used for purposes of description and not of limitation. Reference is here made to the drawings annexed hereto and made an integral part of this specification, in which FIG. 1 is a perspective view of an exemplary gaging device showing gaging heads for each of three different dimensions of a part being gaged, as part of the gaging system embodying the inventive concept.

FIG. 2 is a longitudinal sectional view taken substantially on the line 2—2 of FIG. 1, through one of the gaging heads.

FIG. 3 is a transverse sectional view taken substantially on the line 3—3 of FIG. 2.

FIG. 4 is a somewhat enlarged fragmentary longitudinal sectional view of the switching section of the gaging head illustrated in FIG. 2.

FIGS. 5, 6, 7 and 8 are transverse sectional views taken substantially on the lines 5—5, 6—6, 7—7 and 8—8 of FIG. 4.

Figure 6:
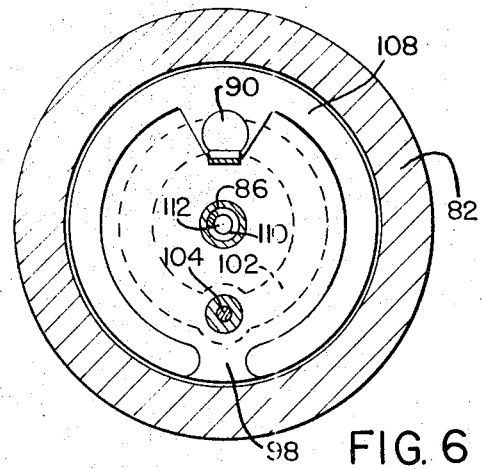
Figure 7:
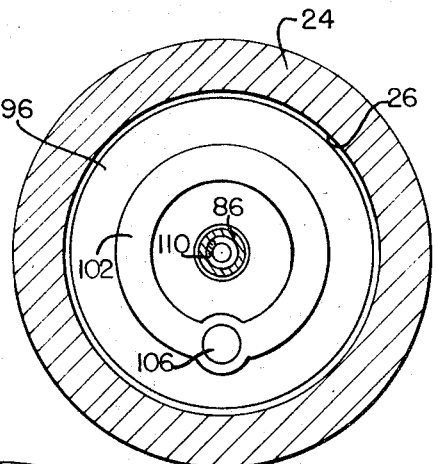
Figure 9:
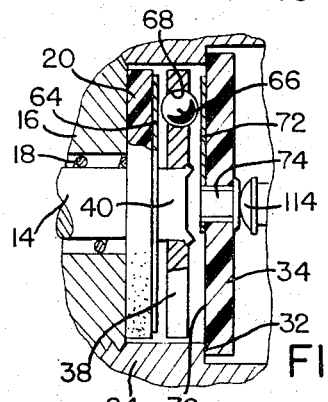
Figure 8:
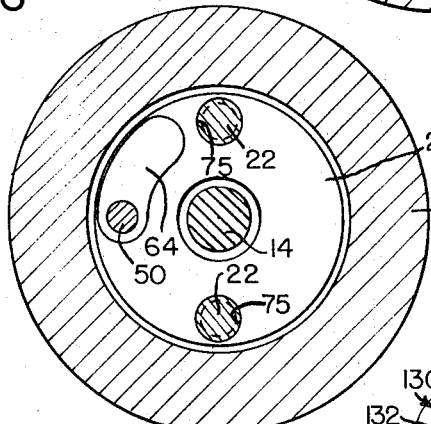

FIG. 9 is a fragmentary longitudinal sectional view taken substantially on the line 9—9 of FIG. 5.

Figure 10:
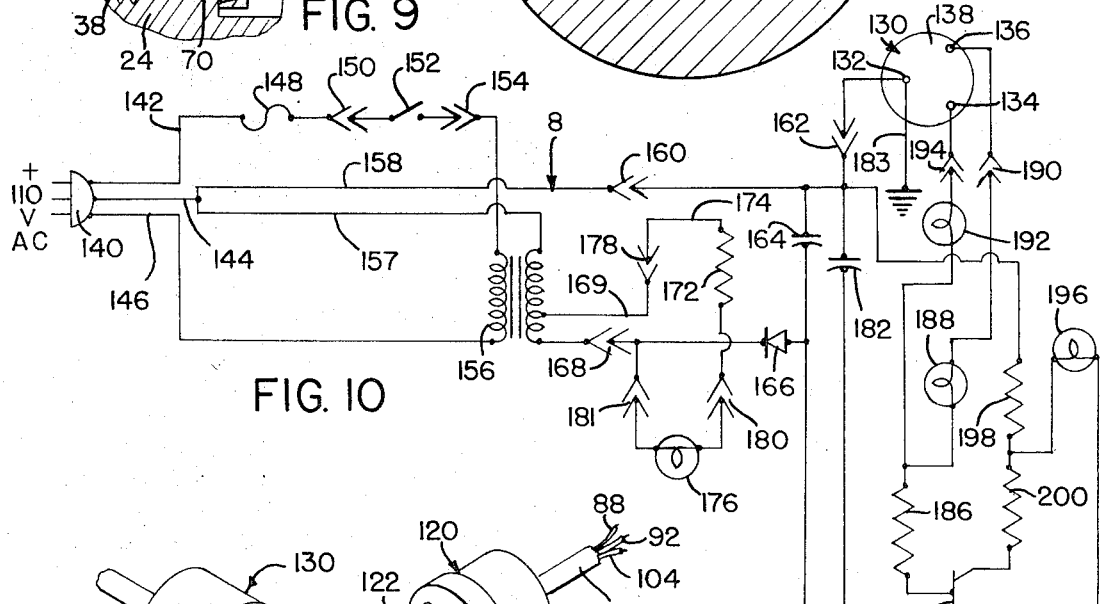

FIG. 10 is a schematic wiring diagram of the electronic signalling system to which the gaging head is connected.

Figure 11:
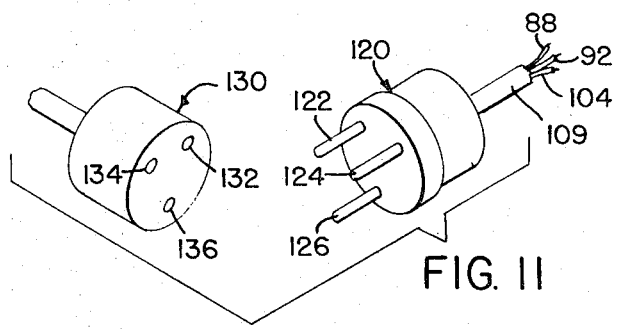

FIG. 11 is a perspective view of the conductor plug and signalling circuit receptacle utilized in the disclosed embodiment of the invention.

Figure 12:
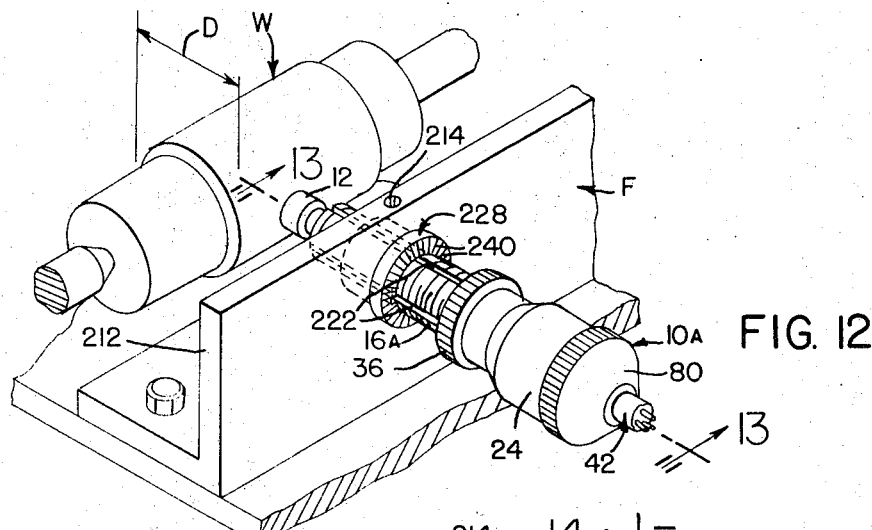

FIG. 12 is a perspective view similar to FIG. 1 of a slightly modified form of the invention, as embodied in the gaging head.

Figure 13:
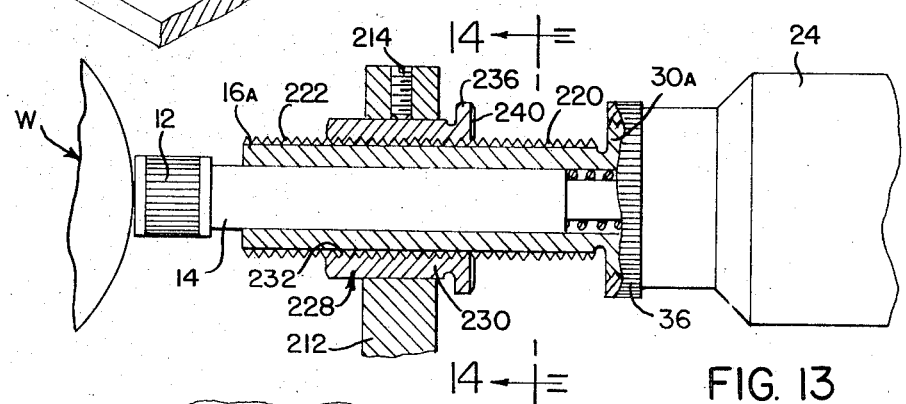

FIG. 13 is a longitudinally extending vertical sectional view partially in elevation taken substantially on the line 13—13 of FIG. 12.

Figure 14:
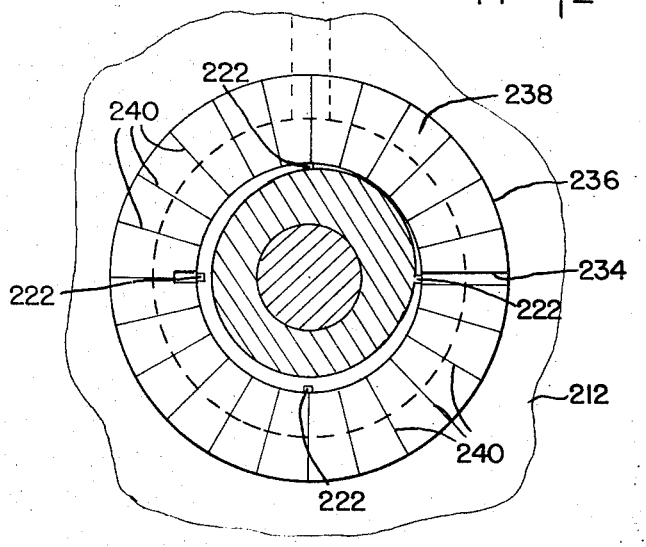

FIG. 14 is a transverse vertical view partially in section taken substantially on the line 14—14 of FIG. 13.

The description given below is a disclosure of a single exemplary embodiment of the invention, and it is to be understood that such description does not limit the scope of application of the invention.

In the preferred embodiment described and illustrated, the gaging system comprises the electronic circuitry 8 (FIG. 10) and the gaging device 10 connected thereto. The gaging device or head 10 comprises an indicator point 12 secured to an indicator stem 14 slidably mounted in the bore 15 of barrel 16, an indicator stem return spring 18 movably disposed in the barrel bore 15 and bearing upon the shoulder 19 adjacent the proximal end of the indicator stem; a lower contact plate 20 removaly secured to the barrel 16 at its proximal end 21 by a pair of guide posts 22, 22 threadedly secured to the barrel end 21, the guide posts having shoulders 23 which bear upon and secure the lower contact plate 20; a counterbored adjusting ring 24 having a bore 26, a hub end 28 internally threaded for engagement with the threaded end portion 30 of the barrel 16 and a counterseat 32 in the bore 26 adapted to seat the upper contact plate 34; a lock nut 36 threaded for rotation upon the threaded end 30 of barrel 16 and adapted to engage the distal end of hub 28 of the adjusting ring 24 so as to secure the latter in positive location once the tolerance spacing between the upper contact plate 34 and the lower contact plate 20 has been established; a movable contact plate 38 secured to the proximal end 40 of the indicator stem 14 and slidably disposed upon the guide posts 22, 22, the movable contact plate being disposed intermediate the lower contact plate 20 and the upper contact plate 34; a cap assembly 41 and a conductor cable assembly 42 connecting electrical components of the cap assembly to the electronic circuitry 8. The adjusting ring 24 is provided at the cap securing end thereof with an internal thread portion 44.

Secured to the lower contact plate 20 adjacent the outer edge thereof is a terminal tube 46 having a shoulder flange 48 adapted to surmount the contact plate and a hub end 50 secured fixedly to the contact plate and disposed above an enlarged countersink opening 52 in the end 21 of barrel 16 (FIG. 4). A contact point 54 is movably disposed in the terminal tube 46 above a biasing spring 56, the contact point being retained within the terminal tube by a slightly inturned flange 58 at the distal end of the terminal tube 46. The countersink 52 is large enough so that the hub end 50 of terminal tube 46 never makes contact with the end 21 of barrel 16.

Lower contact plate 20 secured to the end 21 of barrel 16 is made of an insulating material such as a rigid stable glass epoxy or of an equivalent printed circuit board type material. The upper contact plate 34, which is freely movable upon the guide posts 22, 22 and which normally seats upon the countersink 32 of the adjusting ring 24, is also preferably made of a glass epoxy material or of other similar and equivalent printed circuit board type material which is substantially rigid and stable, both chemically and electrically. The movable contact plate 38 is preferably made of an electrically conductive metal, such as brass or copper, and, as shown particularly in FIG. 5, is secured to the hub end 40 of the indicator stem 14 and is further provided with notches or openings 60, 60 for the guide posts 22, 22 and a notched opening 62 about the terminal tube 46. The lower contact plate 20 is provided on its upper side, i.e. the side opposite that secured to the proximal end 21 of barrel 16 (FIG. 8), with a copper contact area 64 (FIG. 8) deposited thereon by conventional printed circuit board practices and procedures. The metal movable contact plate 38 is further provided with a contact ball 66 secured therein at an opening or socket 68 (FIGS. 4, 5 and 9). As shown particularly in FIG. 9, the upper contact plate 34 is provided on its face 70 with a copper contact area 72, deposited thereon by conventional printed circuit board practices, in a posture to make contact and in register with the contact ball 66 disposed in the metal movable contact plate 38. The upper contact plate is freely movable upon the guide posts 22, 22 and the terminal tube 46 as shown particularly in FIGS. 2, 3 and 4. The copper contact portion 72 of the upper contact plate 34 is electrically connected, by solder, to a metal eyelet 74 secured central of the contact plate.

Lower contact plate 20 is provided with openings 75, 75 to receive the threaded ends of guide posts 22, 22 therethrough, and with an opening 76 for the hub end 50 of terminal tube 46.

Upper contact plate 34 is provided with a clearance opening 77 for the terminal tube 46 and clearance openings 78, 78 for the guide posts 22, 22.

Thus, in the adjusting ring and barrel subassembly, a non-conductive lower contact plate 20 is fixably secured by the guide posts 22, 22 to the proximal end of the barrel 16 and within the hub end of the adjusting ring 24. The metal contact plate 38 is movable by the indicator point 12 and stem 14 operating against the spring 18 in the bore 15, and the upper contact plate 34 is freely movable upon the guide posts 22, 22 and the terminal tube 46. The terminal tube 46 is electrically connected to the copper contact portion 64 on the lower contact 20, and ball 66 makes electrical connection with either the copper contact portion 64 of lower contact plate 20 or with the copper contact portion 72 of upper contact plate 34 as it moves into contact with the one or the other.

The cap assembly 41 comprises a cap body 80, an externally threaded hub end 82, and a counter bore 84 within which is located the centrally disposed terminal tube 86 electrically connected to a conductor 88, the inner contact post 90 electrically connected to a conductor 92, and the contact post 94 electrically connected to the conductor 104. The cap assembly 41 is further provided with a pair of discs 96 and 98, which are each made of an insulating material, such as a glass epoxy or other equivalent circuit board type material, and are arranged in contiguous contact one above the other. Disc 96 is provided on its outer face 100 with an annular ring deposit of copper 102 (FIG. 7) providing an electrical contact for the terminal tube contact point 54. The annular contact ring 102 is also electrically connected to the contact post 94 and the conductor 104 at the soldered connection 106, contact post 94 passing through both discs 96 and 98. Disc 98 is provided with an annular copper deposit contact ring 108 (FIG. 6) electrically connected to the contact post 90 and to conductor 92.

The cap assembly 41 is further provided with the central terminal tube 86, connected to conductor 88, in which is seated spring 110 biased against the movable contact post 112 having its contact point 114 adapted to make electrical contact with the eyelet 74 mounted central of the upper contact plate 34.

As shown particularly in FIG. 4, the discs 96 and 98 are each provided on their outer surfaces with the printed copper contact ring portions 102 and 108, respectively. These discs are secured together by a suitable adhesive or mechanically in any suitable manner, whereby the electrically conductive terminal tube 86 is not shorted out but is maintained in an insulated manner with respect to the discs and their copper contact rings.

The conductor cable assembly 42 comprises the insulated conductors 88, 92 and 104, within an outer sheathing 109 of a suitable insulating material, leading from the terminal tube 86, contact post 90 and contact post 94, respectively. These conductors terminate in a plug 120 and are electrically connected to conductor prongs 122, 124 and 126 respectively for the conductors 88, 92 and 104 (FIG. 11). These plug prongs are designed for reception in and connection with the receptacle 130 having prong receiving contacts 132, 134 and 136 suitably secured in the receptacle body 138.

As shown particularly in FIG. 10, the electronic circuitry 8 forming a part of the gaging system herein disclosed comprises a power plug 140 for connection to a source of alternating current line voltage and having conductors 142, 144 and 146 leading therefrom. Conductor 142 connects in series a fuse 148, a jack 150, a manually operated on-off switch 152, and a second jack 154 with one end of the primary winding of a transformer 156. Conductor 146 is connected to the other end of the primary winding to complete the primary circuit.

The secondary winding of the transformer 156 has one end connected to a conductor 157 which is in turn connected to the conductor 144 and to the series circuit including the conductor 158, plug and jack 160, capacitor 164, diode 166, and plug and jack 168 to the other end of the secondary winding, forming a conventional halfwave rectifying circuit. The tapped winding of the secondary further connects in a series circuit with conductor 169, plug and jack 178, resistor 172, plug and jack 180, pilot lamp 176, plug and jack 181, and plug and jack 168, forming a pilot lamp circuit. One end of the transformer secondary winding is connected to the alternating current source ground by conductor 144, which is connected to the conductor 157, and is also grounded to the circuit box by way of conductor 158, plug and jacks 160 and 162, the terminal receptor 132 of connector 130, and the conductor 183. Capacitors 164 and 182 are connected in parallel, one side served by conductor 158, the other side connected to the emitter of transistor 184.

A series circuit comprising plug and jack 194, signal lamp 192 and the resistor 186 is connected to the terminal receptor 134 of connector 130 and to the base of transistor 184. Another series circuit comprising the plug and jack 190, signal lamp 188 and resistor 186 is also connected to the base of transistor 184, its other end being connected to terminal receptor 136. A series circuit comprising resistor 198 and 200 is connected to the collector of transistor 184 at one end and to the junction of capacitors 164 and 182 at the other end. The emitter of transistor 184 connects to the junction of capacitor 164 and diode 166. One terminal of signal lamp 196 is connected to the junction of resistors 198 and 200 and the other terminal to the emitter of transistor 184.

The electronic circuit 8 provides the indicating means for signalling the presence in the work W at any particular dimension being gaged by the gaging head 10 of an undersize dimension signalled by the lamp 188, or of an oversize dimension signalled by the lamp 192, or provides an indication through signal lamp 196 that the dimension is within the tolerance limits set by the lower contact plate 20 and the upper contact plate 34.

The operation of the gaging system and the gaging head 10 is as follows. A workpiece W is positioned in any suitable manner in a fixture F designed to support one or more of the gaging units 10 therein in gaging relationship to the workpiece, the barrel 16 being supported in a member 212 of the fixture and secured thereto in fixed relationship by a screw or other fastening means 214. The gaging head barrel is disposed in the supporting element 212 of fixture F in such an attitude and posture with respect to the workpiece W that it will gage the dimension of the workpiece as required, i.e. a lineal or a curved or other dimension.

Prior to insertion of the gaging head barrel into the fixture, the tolerance limits of the gaging head 10 are first established. This is done by means of the adjusting ring 24 which is adjustably threaded upon the threaded portion 30 of the barrel 16. It will be observed that the upper contact plate 34 is seated directly against the counterbore shoulder 32 of the adjusting ring. It will also be observed that the terminal tube 86, which embodies the spring 110 and the contact 112, has its contact point 114 bearing directly upon the upper contact plate grommet or eyelet 74, establishing a bias of the plate 34 against its seat 32.

The adjusting ring 24 is threaded upon the portion 30 of barrel 16 so that the upper contact plate 34 seated against the counterbore shoulder 32 is spaced a distance from the lower contact plate 20 secured to and against the proximal end 21 of the barrel 16, the spacing between the printed copper contact portions 64 and 72, minus the diameter of ball 66, being substantially equivalent to the tolerance limits for the dimension of the workpiece being gaged. It will be noted that the movable metal contact plate 38 secured to the indicator stem 14 travels between its contact with the printed copper portion 64 on the base of the lower fixed contact plate 20 and the printed copper portion 72 on the upper contact plate 34 (FIG. 9), the travel distance of the ball 66 from the one plate to the other being the equivalent tolerance allowed by the setting of the adjusting ring 24. Once this tolerance limit is established, the lock nut 36 is threadedly secured upon the thread portion 30 against the hub end 28 of the adjusting ring, and the latter then being fixed in position, the spacing of upper contact plate 34 also becomes fixed. The terminal tube 86 of the cap assembly 41 having its contact point 114 bearing upon the upper contact plate at the grommet 74 holds the upper contact plate to its counterbore seat 32 in a resilient manner. Thus, if the workpiece dimension is oversize, the travel of the indicator stem 14 and the movable contact plate 38 may be such as to move the upper contact plate 34 upon the guide posts 22, 22 and within the counterbore 26 against the movable contact 114 forcing the contact post 112 against the spring 110 in the terminal tube 86. Since the upper contact plate 34 is always biased toward the counterbore seat 32 by the resilient spring 110, the tolerance spacing with the lower contact plate 20 remains fixed.

Once the tolerance limits of the contact plates 20 and 34 have been set, the gaging head barrel 16 is located in the support element 212 of Fixture F, the indicator point 12 is positioned against a master workpiece W having a known specified dimension to be gaged. The setting of the gaging head barrel 16 is then established with respect to the master workpiece so that the movement of the indicator stem 14 properly positions the movable contact plate 38 for closing one or the other of the circuits made in the following manner.

The signalling system of electronic circuit 8, served by a conventional source of alternating current through plug 140, permits the establishment of current through the connector receptacle 130 and its terminal receptor 136 to the signal lamp 188 when the dimension D being gaged is undersize, or to the signal lamp 192 through contact 134 when such dimension is oversize. Undersize signalling is accomplished by the indicator point 12 moving further to the left as shown in FIGS. 1, 2, 4 and 9, in the following manner.

When dimension D is undersize, the signalling system of electronic circuit 8 provides a current path through a series circuit from the positive side of the half wave rectifier comprising capacitor 164, plug and jack 162, terminal receptor 132, plug terminal 124, conductor 92, contact post 90, contact ring 108, cap body 80, adjusting ring 24, lock nut 36, barrel 16, indicator stem 14, movable contact plate 38, contact ball 66, copper contact area 64, terminal tube 46, spring 56, contact point 54, copper ring 102, soldered connection 106, contact post 94, conductor 104, plug terminal 126, connector terminal 136, plug and jack 190, signal lamp 188, resistor 186, the baseemitter junction of transistor 184 and to the negative side of the half wave rectifier which is the junction of capacitor 164 and diode 166. The establishment of this current circuit through lamp 188 causes it to become illuminated and signal the presence of an undersize dimension. The same current flows through the base-emitter junction of transistor 184 to bias the transistor and cause collector current to flow from the positive side of the half wave rectifier through resistors 198 and 200 and transistor 184 to the negative side of the half wave rectifier. This collector current flow through resistor 198 causes a voltage drop across resistor 198 which lowers the voltage across signal lamp 196 to a value below that required to illuminate the lamp. In this manner, the establishment of current through signal lamp 188 occasioned by the presence of an undersize dimension causes lamp 196 to be extinguished.

An oversize dimension is signalled by travel of the indicator stem 14 to the right in FIGS. 1, 2, 4 and 9, the circuit to signal lamp 192 being accomplished as follows. A series circuit is provided from the positive side of the half wave rectifier through the plug and jack 162, terminal receptor 132, plug terminal 124, conductor 92, contact post 90, contact ring 108, cap body 80, adjusting ring 24, lock nut 36, barrel 16, indicator stem 14, movable contact plate 38, contact ball 66, copper contact area 72, metal eyelet 74, contact point 114, movable contact post 112, spring 110, central terminal tube 86, conductor 88, plug terminal 122, terminal receptor 134, plug and jack 194, signal lamp 192, resistor 186, base-emitter junction of transistor 184 and to the negative side of the half wave rectifier at the junction of diode 166 and capacitor 164. The establishment of this current circuit through the signal lamp 192 causes it to become illuminated and signal the presence of an oversize dimension. The same current flow through the transistor bas-emitter junction biases the transistor on and causes collector current to flow from the positive side of the half wave rectifier through resistors 198 and 200 and transistor 184 to the negative side of the rectifier. Flow of collector current through resistor 198 effects a voltage drop thereacross sufficient to lower the value of the voltage across signal lamp 196 below that required to illuminate it. In this manner, the establishment of current flow through signal lamp 192 due to the presence of an oversize dimension causes signal lamp 196 to be extinguished.

If a circuit to either of signalling lamps 188 or 192 should not be closed, as when the movable metal contact plate 38 and its contact ball 66 are disposed in a position intermediate and spaced from the copper contact area 64 on the lower contact plate 20 and the copper contact area 72 on the upper contact plate 34, occasioned by the dimension D being within tolerance limits, neither of the above-described undersize or oversize circuits to the signalling lamps 188 and 192 respectively will then be closed, permitting no flow of current through the base-emitter junction of transistor 184. Transistor 184 will then be biased off, preventing collector current flow through resistor 198. The voltage drop across the resistor will then be small, raising the voltage across the signal lamp 196 to a value sufficient to illuminate the lamp by current flow supplied by the half wave rectifier. Thus, removal of current flow through lamps 188 and 192 causes lamp 196 to signal the presence of a within-tolerance dimension.

The on-off pilot lamp 176 merely indicates the presence of current passing through the electronic signalling circuit 8 from the plug 140 through the step-down transformer 156 and through the diode 166.

The slightly modified form of the gaging head 10a as shown particularly in FIGS. 12, 13 and 14, includes the substitution of the externally threaded barrel 16a for the smooth barrel 16, which has a finely threaded outer surface 220 and an externally threaded hub portion 30a substantially identical with the threaded portion 30 of barrel 16, and a plurality of longitudinally extending narrow grooves, slots or lines 222 disposed in equally spaced radial relationship through the threaded portion 220. An internally threaded split bushing 228 threadedly engageable with the threaded portion 220 of barrel 16a is provided for securement of the gaging head 10a in the fixture member 212. The barrel 16a is provided as a full substitute for the barrel 16 of gaging head 10, the differences therebetween constituting the outer threaded surface portion 220 and the longitudinally extending grooves or lines 222. The internally threaded split bushing 228 comprises a body portion 230, an internally threaded bore 232, a slot 234 through a wall of the body 230, and a hub 236 at one end of the body, the hub outer surface 238 having a plurality of equally spaced radial graduation marks or lines 240 indicating equal increments of rotation and/or axial movement upon the threaded portion 220 of barrel 16a when referenced to the grooves or lines 222 of the barrel 16a.

The modification of the gaging head 10 illustrated in FIGS. 12–14 inclusive provides a means for adjustably securing the gaging head 10 in the fixture F, merely by rotating the barrel 16a in the threaded split bushing 228, which is held in position by the fastening screw 214 threadedly mounted in the fixture wall or member 212. When the desired position of the indicator point 12 with respect to the surface of the work which is to be gaged has been attained, through rotation of the barrel 16a in the split bushing 228, the set screw 214 is advanced against the outer wall of the split bushing to secure the gaging head barrel 16a in locked position in the fixture wall 212. The threaded portions 220 of barrel 16a and 232 of split bushing 228 provide precise micrometric-like adjusting movement of the gaging head 10a in setting up the fixture F for dimensional gaging of the workpiece W. In rotating the barrel 16a in the split bushing 228, the rotative movement of the longitudinally extending slots or lines 222 with respect to the graduation marks 240 on hub surface 238 indicates a precise axial movement toward or away from the surface of the workpiece W being gaged. Thus, each graduation mark 240 may be spaced a distance equal to an advance of a given factor, say .001", along the threaded portion 220 of barrel 16a, or any multiplication of such factor; and when manual adjustment of the indicator point 12 is made by the operator setting the gaging head 10a in service, he can determine by reference to the longitudinal lines 222 and their rotation in respect to the graduation marks 240, how far he must advance or retract the barrel 16a in the bushing 228 in order to properly set the beginning of the gaging function of the head unit 10a. The modified form and structure of the gaging head device, as illustrated in FIGS. 12–14 inclusive provide a precise means for more easily setting the device and system in functional operation.

It is, of course, to be clearly understood that the representation of the fixture F is merely schematic, such a fixture normally being designed by persons skilled in the art with respect to such gaging equipment so as to provide a secure means for supporting the gaging head and the workpiece W, the part to be gaged, in gaging relationship to such head. Although the gaging heads 10 and 10a are shown disposed in FIGS. 1 and 12 in a position and attitude to indicate the dimensions of a circular section, such gaging device can also be suitably arranged in a proper fixture for indicating a longitudinal dimension, or the dimention of a compound or complex surface, be it transverse or longitudinal.

The indicator point 12 and stem 14 are made of conventional steel materials. The barrel 16 and 16a, guide posts 22, 22 and movable contact plate 38 are preferably made of brass; the lock nut 36, adjusting ring 24 and cap body 80 preferably of an aluminum alloy; the terminal contact tubes and contact plates and points of brass; the split bushing 228 of steel; the springs of steel such as music wire; and the insulating contact plates 20 and 34 and the discs 96 and 98 of a glass epoxy or equivalent printed circuit board type material.

The signalling circuit portion beyond the secondary winding of transformer 156 is of relatively low current, as for example a 2-milliampere current to the signal lamps 188, 192 and 196. The on-off pilot signal lamp 176 is powered by the tapped winding of the transformer 156 secondary.

It will be observed that the only movable elements in the gaging system of this invention are the indicator stem 14 and its surmounted metal movable contact plate 38, which travels between the fixed tolerance limits of the lower and upper contact plates 20 and 34 established by the adjusting ring 24 on the barrel 16. The circular printed contact portion 102 of the disc 96 and the printed copper contact ring 108 of the disc 98 permit connection with the terminal tube 46 at its contact 52 at any rotated position of the cap body hub 82 upon the adjusting ring 24. Inasmuch as the lower contact plate is maintained in a fixed position by the guide posts 22, 22 threadedly secured to the barrel 16, and the movable contact plate 38 is guided by such guide posts in a posture such that the ball 66 is always in register (a) with the printed copper contact area 64 of the lower contact plate 20 and (b) with the printed copper contact area 72 of the upper contact plate 34, also positioned upon the guide posts 22, 22, the spacing of these copper contact areas from each other determines the tolerance limits established by the adjusting ring 24 upon the threaded barrel portion 30.

Although a particular preferred embodiment of the invention has been disclosed herein for purposes of explanation, further modifications or variations thereof, after study of this specification, will or may become apparent to those skilled in the art to which the invention pertains. Reference should be had to the appended claims in determining the scope of the invention.

We claim:
1. In a system for gaging a workpiece dimension, the combination comprising
   a gaging device,
   an electronic circuit connected and responsive to said device and having branches therein signalling the presence of an undersized, oversized, or a within-tolerance dimension of said workpiece being gaged,
   said gaging device comprising
      an adjusting ring, a barrel adjustably secured to one end of said adjusting ring, an indicator stem slidably movable in said barrel and having an indicator pin at its distal end disposed outboard of said barrel for making surface contact with said workpiece dimension being gaged, and a cap removably secured to the other end of said adjusting ring and providing a conduit for conductors in said circuit, an electrical switch contained within said adjusting ring and said cap, and having a first fixed contact plate secured to the proximal end of said barrel in said adjusting ring and in a first branch of said circuit for signalling the presence of an undersized dimension, a second contact plate axially movable in said adjusting ring and spaced apart from said first contact plate, and in a second branch of said circuit for signalling the presence of an oversized dimension, means for adjustably setting and fixing the at-rest position of said movable second contact plate comprising said adjusting ring and said barrel, whereby said second contact plate is adjustably movable toward and away from said first contact plate, movable switch contact means in said circuit secured to the proximal end of said indicator stem and intermediate and spaced from said first and second contact plates for closing either of said first and second circuit branches, a third branch in said circuit operative for signalling the presence of a within-tolerance dimension in the absence of branch circuit-closing contact by said movable switch contact means.

2. In the system defined in claim 1, wherein said barrel is threaded externally, said gaging device further comprising an internally threaded split bushing secured in said gaging device support and adapted to adjustably support and secure said threaded barrel therein.

3. In the system defined in claim 1, wherein said adjusting ring comprises a body having a counterbore and a bore therein, said fixed first contact plate being fixedly secured to the proximal end of said barrel and disposed in said bore, said movable second contact plate being movably disposed in said counterbore and having an at-rest position upon the seat of said counterbore.

first resilient means disposed in said counterbore and secured to said cap biasing said movable second contact plate toward its at-rest position against said counterbore seat, said movable switch contact means comprising a third contact plate secured to the proximal end of said indicator stem and disposed intermediate and spaced from said first and second contact plates, and second resilient means in said barrel biasing said third contact plate toward said first contact plate.

4. The system defined in claim 3, and wherein said movable switch contact means further comprises a contact ball secured in said third contact plate so that a portion of said ball projects from each side of said plate.

5. The system defined in claim 3 wherein said gaging device further comprises guide means for said movable second contact plate and said third contact plate fixedly securing said first contact plate to said barrel, said movable contact plate and said third contact plate being slidingly guided in their axial movement upon said guide means.

6. The system defined in claim 1, wherein said gaging device cap comprises a chambered body, a hub portion at one end of said body adapted to securely engage a complementary portion of said adjusting ring, electrically insulated means having circuit-making contact areas on outwardly directed opposed surfaces thereof secured at the proximal end of said body.

7. The system defined in claim 6, wherein said electrically insulated means comprises a pair of insulating discs arranged in back-to-back relationship, each of said discs having a circuit-making contact area on the outwardly directed surface thereof, said disc facing outwardly of said cap having said circuit-making contact area on its outer face in said first branch, and said disc facing inwardly of said cap having said circuit-making contact area on its face directed inwardly of said cap.

8. The system defined in claim 6, and wherein each of said contact areas has a conductor electrically connected thereto and issuing from said cap.

9. The system defined in claim 3, wherein said fixed first contact plate is provided with a first branch circuit-making contact area facing said third contact plate, said movable second contact plate being provided with a second branch circuit-making contact area facing said third contact plate and a conductor electrically connected with said latter contact area and disposed through said movable second contact plate, said first resilient means making electrical connection with said latter conductor disposed through said movable second contact plate.

10. The system defined in claim 9, wherein said cap is provided with a conductor electrically connected to said first resilient means and issuing from said cap.

11. An electrical switch-type gaging device in a system for gaging a workpiece dimension comprising an adjusting ring, a barrel adjustably secured to one end of said adjusting ring, an indicator stem slidably movable in said barrel and having an indicator pin at its distal end disposed outboard of said barrel for making surface contact with said workpiece dimension being gaged, a cap removably secured to the other end of said adjusting ring and adapted to provide a conduit for conductors in a circuit adapted to be connected and responsive to said device and having branches therein signalling the presence of an undersized, oversized, or a within-tolerance dimension of said workpiece being gaged, and an electrical switch contained within said adjusting ring and said cap, and having a first fixed contact plate secured to the proximal end of said barrel in said adjusting ring and in a first branch of said circuit for signalling the presence of an undersized dimension, a second contact plate axially movable in said adjusting ring and spaced apart from said first contact plate, and in a second branch of said circuit for signalling the presence of an oversized dimension, means for adjustably setting and fixing the at-rest position of said movable second contact plate comprising said adjusting ring and said barrel, whereby said second contact plate is adjustably movable toward and away from said first contact plate, movable switch contact means in said circuit secured to the proximal end of said indicator stem and intermediate and spaced from said first and second contact plates for closing either of said first and second circuit branches, a third branch in said circuit operative for signalling the presence of a within-tolerance dimension in the absence of branch circuit-closing contact by said movable switch contact means.

12. The device defined in claim 11, wherein said gaging device further comprises
an adjusting ring,
a barrel adjustably secured to one end of said adjusting ring,
an indicator stem slidably movable in said barrel and having an indicator pin at its distal end disposed outboard of said barrel for making surface contact with said workpiece dimension being gaged,
and a cap removably secured to the other end of said adjusting ring.

13. The device defined in claim 12, wherein
said barrel is threaded externally,
said gaging device further comprising an internally threaded split bushing adapted to be secured in a gaging device support and to adjustably support and secure said threaded barrel therein.

14. The device defined in claim 12, wherein said adjusting ring comprises
a body having a counterbore and a bore therein, said fixed first contact plate being fixedly secured to the proximal end of said barrel and disposed in said bore,
said movable second contact plate being movably disposed in said counterbore and having an at-rest position upon the seat of said counterbore,
first resilient means disposed in said counterbore and secured to said cap biasing said movable second contact plate toward its at-rest position against said counterbore seat,
said movable switch contact means comprising a third contact plate secured to the proximal end of said indicator stem and disposed intermediate and spaced from said first and second contact plates,
and second resilient means in said barrel biasing said third contact plate toward said first contact plate.

15. The device defined in claim 14, wherein
said movable switch contact means further comprises
a contact ball secured in said third contact plate so that a portion of said ball projects from each side of said plate.

16. The device defined in claim 14, wherein said gaging device further comprises
guide means for said movable second contact plate and said third contact plate fixedly securing said first contact plate to said barrel,
said movable contact plate and said third contact plate being slidingly guided in their axial movement upon said guide means.

17. The device defined in claim 12, wherein said gaging device cap comprises
a chambered body,
a hub portion at one end of said body adapted to securely engage a complementary portion of said adjusting ring,
electrically insulated means having circuit-making contact areas on outwardly directed opposed surfaces thereof secured at the proximal end of said body.

18. The device defined in claim 17, wherein said electrically insulated means comprises
a pair of insulating discs arranged in back-to-back relationship,
each of said discs having a circuit-making contact area on the outwardly directed surface thereof,
said disc facing outwardly of said cap having said circuit-making contact area on its outer face,
and said disc facing inwardly of said cap having said circuit-making contact area on its face directed inwardly of said cap.

19. The device defined in claim 17, wherein
each of said contact areas has a conductor electrically connected thereto and issuing from said cap.

20. The device defined in claim 14, wherein
said fixed first contact plate is provided with a circuit-making contact area facing said third contact plate,
said movable second contact plate being provided with a circuit-making contact area facing said third contact plate and a conductor electrically connected with said latter contact area and disposed through said movable second contact plate,
said first resilient means making electrical connection with said latter conductor disposed through said movable second contact plate.

21. The device defined in claim 20, wherein
said cap is provided with a conductor electrically connected to said first resilient means and issuing from said cap.

22. The system defined in claim 1, and wherein said system is provided with
means for releasably connecting said gaging device to said electronic circuit.

23. The system defined in claim 22, wherein
said releasably connecting means comprises a plug and socket device.

24. The system defined in claim 1, wherein said system further comprises
means for supporting said gaging device in gaging relationship with a workpiece dimension to be gaged.

References Cited

UNITED STATES PATENTS

| | | | |
|---|---|---|---|
| 1,535,615 | 4/1925 | Maag | 33—172(E) |
| 1,897,566 | 2/1933 | Alden | 33—172(E) |
| 2,047,408 | 7/1936 | Emery et al. | 33—172(E) |
| 2,793,441 | 5/1957 | Frenk | 33—172(E) |

SAMUEL S. MATTHEWS, Primary Examiner